No. 745,487. PATENTED DEC. 1, 1903.
R. L. FRINK & W. DE H. LEE.
ENDLESS CARRIER FOR SHEET GLASS.
APPLICATION FILED SEPT. 2, 1902.
NO MODEL.
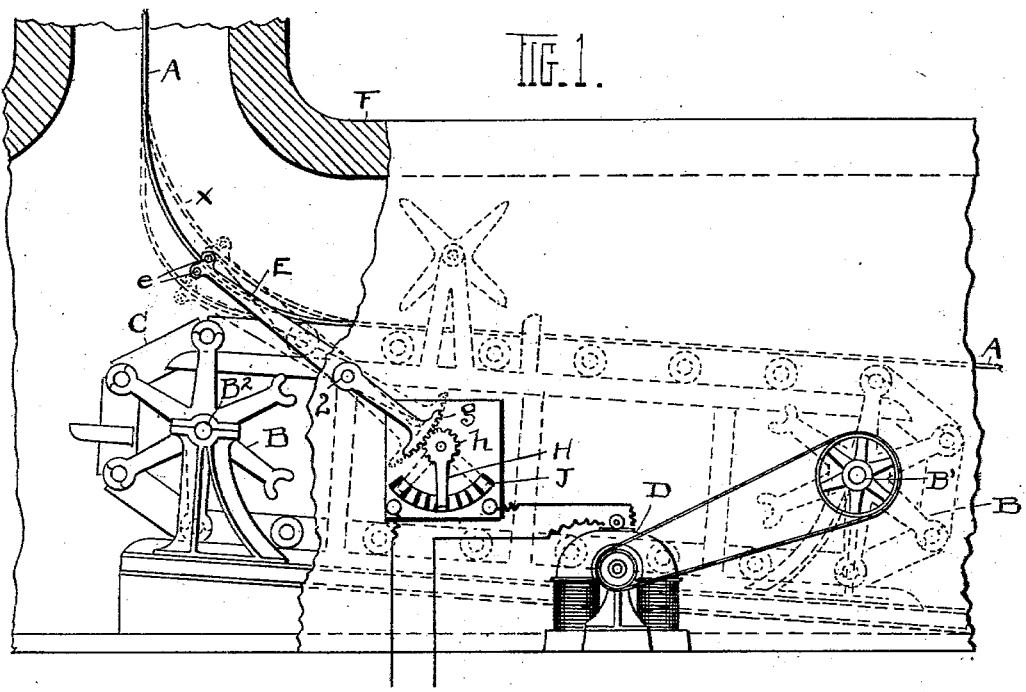
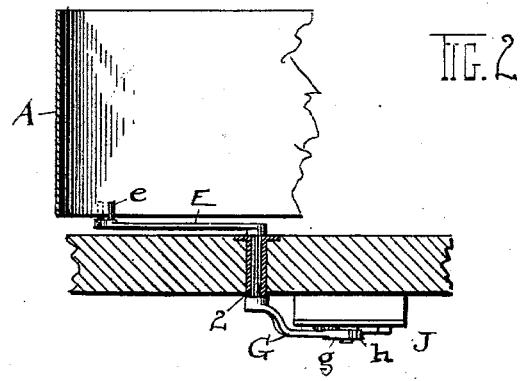
INVENTORS.
Robert L. Frink
Walker De Harn Lee,
BY H. T. Fisher
ATTY No. 745,487.

Patented December 1, 1903.

UNITED STATES PATENT OFFICE.

ROBERT L. FRINK AND WALKER DE HAVEN LEE, OF CLEVELAND, OHIO, ASSIGNORS, BY DIRECT AND MESNE ASSIGNMENTS, TO THEMSELVES, H. R. SANBORN, J. N. CLARKE, AND J. A. LANNERT, OF CLEVELAND, OHIO.

ENDLESS CARRIER FOR SHEET-GLASS.

SPECIFICATION forming part of Letters Patent No. 745,487, dated December 1, 1903.

Application filed September 2, 1902. Serial No. 121,755. (No model.)

*To all whom it may concern:*

Be it known that we, ROBERT L. FRINK and WALKER DE HAVEN LEE, citizens of the United States, residing at Cleveland, in the county of Cuyahoga and State of Ohio, have invented certain new and useful Improvements in Endless Carriers for Sheet-Glass; and we do declare that the following is a full, clear, and exact description of the invention, which will enable others skilled in the art to which it appertains to make and use the same.

Our invention relates to sheet-glass manufacture; and the object of the invention is to provide a sheet-glass carrier with means whereby the speed of the carrier may be automatically controlled from or by the glass sheet, all substantially as shown and described, and particularly pointed out in the claims.

In the accompanying drawings, Figure 1 is a side elevation of an endless sheet-glass carrier shown as located within an inclosing wall partly in section; and Fig. 2 is a plan view of certain parts adapted to regulate the speed of the carrier, as hereinafter fully set forth.

The mechanism thus shown and briefly described constitutes a section or part of a sheet-glass manufacturing apparatus in which there are means (not shown) for producing a continuous sheet of glass A in a more or less flexible or semihardened form, and which is delivered at a rate of speed which presumably is regular and uniform, but may vary more or less, according to conditions in the manufacture of the sheet, and in which state it comes to the part of the machine shown here and embodied in this invention. As sheet A is thus delivered it is received on endless carrier or flattening-table C, which is supported on suitable wheels B and shafts B' and B², on which the carrier travels. In this instance the carrier is driven by an electric motor D, connected by belt or gearing with shaft B'. From the carrier or table C the glass passes over upon what we term a "cracking-off" table on the same level (not shown) but designed to be operatively connected up with carrier C, so as to take its speed automatically therefrom and be uniform therewith at all times. Hence any speed-regulator for this carrier also serves indirectly to govern the speed of the carrier beyond.

Now in order that carrier C shall be caused to travel neither too fast nor too slow for the glass sheet, which has its speed fixed by parts through which it passes in advance of this invention, we provide a speed-controller for the carrier or for the motor which drives the carrier and which has its initial operating member upon the glass sheet itself through pivoted lever E. This lever is fixed on pivot-shaft 2, which extends out through the wall F, inclosing the carrier at its sides and top, and on the other end of the said shaft outside said wall there is an arm G, having a segmentally-geared head $g$ engaging the segmentally-geared head $h$ of the controller-arm H. Said arm H is in electrical circuit with motor D and runs on contact-points J, so as to control or govern the speed of the motor in the usual way.

Lever E has a set of plain or roller fingers $e$ on its inner upper portion adapted to engage over the edge and sides of the continuous glass sheet and to be governed in position thereby, so that as the glass may sag more or less by reason of too slow a speed in the carrier to take it away the said lever will move down with the glass and through arm G effect a corresponding change upon the position of controller-arm H and increase the speed of travel. If the sag is much, the motor and carrier will thus be caused to increase their speed correspondingly and take it up, and if the speed becomes excessive and the glass rises, say, to dotted line $x$, or thereabout, the positions of lever E and arm G will be correspondingly changed and the speed of the carrier will be diminished by turning the controller-arm in the opposite direction and reducing the current on the motor.

Thus the play of the glass in its suspended position as it approaches the carrier serves to automatically fix the speed of the carrier by which the glass is borne along, and the two vibratory parts E and G move together and impart their movements to controller-arm H in a way that is at once sensitive and certain.

What we claim is—

1. In sheet-glass manufacture, an endless carrier for the glass sheet and a wall inclosing the same, means to regulate the speed of the carrier comprising an electric speed-controller and means for governing the controller having a running engagement with the glass sheet inside said wall before it reaches the carrier, the said controller located outside said wall, substantially as described.

2. The glass-sheet carrier and a pivoted lever mechanism constructed to run in engagement with the glass sheet, in combination with an electric controller operatively connected with said mechanism, whereby the position of the controller is automatically changed by said lever mechanism and the speed of the carrier regulated, substantially as described.

3. In glass-manufacturing machinery constructed to handle a continuous sheet of glass, an endless carrier, an electric motor for driving the same, an electric controller in the circuit of the motor to govern the speed of the carrier, and means to make working engagement with the sheet of glass to regulate the position of the controller, substantially as described.

4. In sheet-glass manufacture, the endless carrier for the glass sheet and the electric motor to drive the carrier, in combination with a speed-controller for the carrier arranged in the circuit of the motor and means connected with said controller to automatically govern its position and the speed of the motor from the glass sheet, said means comprising a vibratory arm to run on said sheet, substantially as described.

5. In sheet-glass manufacture, an endless carrier and a wall inclosing the same, said wall constructed to allow a continuous sheet of glass to pass onto the carrier, and a speed-controlling mechanism for the carrier comprising a lever inside said wall provided with means at one end to engage the glass sheet in its approach to the carrier and a shaft extending through said wall on which said lever is fixed, in combination with an electric controller outside said wall operatively connected with said shaft, substantially as described.

6. In sheet-glass manufacture, an endless carrier for the glass sheet, wheels and shafts for said wheels for supporting and rotating the carrier, an electric motor connected up with one of said shafts to drive the same and a speed-controller for said motor, in combination with mechanism to govern said controller constructed to have initial operative engagement with the sheet of glass before it reaches the said carrier, substantially as described.

7. In sheet-glass manufacture, an endless carrier for the glass and a wall inclosing the carrier, in combination with devices adapted to control the speed of the carrier and constructed to effect operative engagement with the glass before it reaches the carrier, said devices comprising a member having an engaging portion beneath the glass sheet inside said wall and a controlling member operatively engaged therewith outside said wall, substantially as described.

Witness our hands to the foregoing specification this 26th day of July, 1902.

ROBERT L. FRINK.
WALKER DE HAVEN LEE.

Witnesses:
R. B. MOSER,
A. U. MOSER.